S. SEGAL.
LOCK.
APPLICATION FILED APR. 6, 1915.
Reissued Apr. 11, 1916. 14,108.
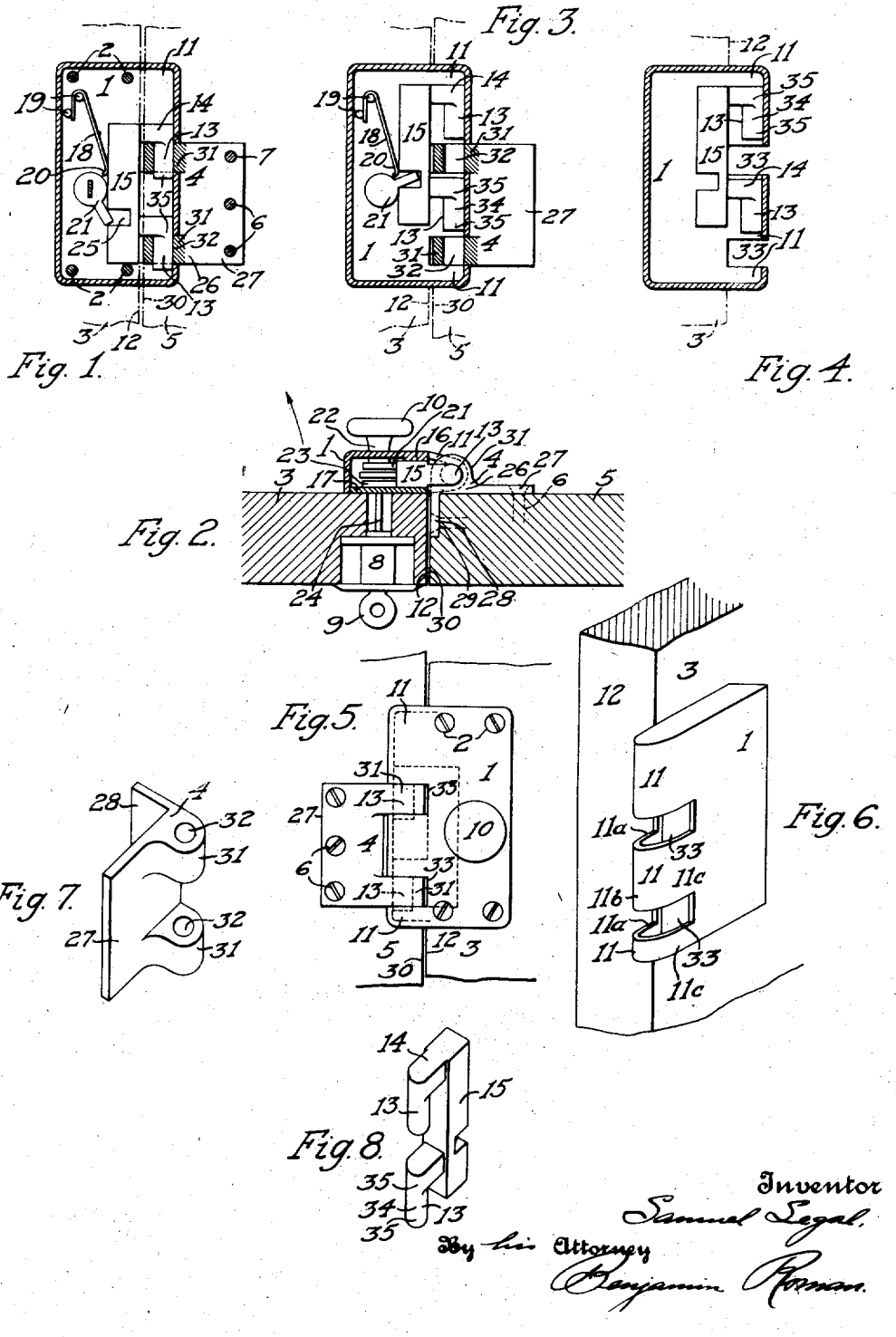
Inventor
Samuel Segal.
By his Attorney
Benjamin Roman.

UNITED STATES PATENT OFFICE.

SAMUEL SEGAL, OF NEW YORK, N. Y., ASSIGNOR, BY MESNE ASSIGNMENTS, TO BURGLAR PROOF LOCK AND HARDWARE CORPORATION, OF NEW YORK, N. Y., A CORPORATION OF NEW YORK.

LOCK.

14,108. Specification of Reissued Letters Patent. Reissued Apr. 11, 1916.

Original No. 1,065,848, dated June 24, 1913, Serial No. 734,743. Application for reissue filed April 6, 1915. Serial No. 19,566.

*To all whom it may concern:*

Be it known that I, SAMUEL SEGAL, a citizen of the United States, and a resident of the city, county, and State of New York, have invented certain new and useful Improvements in Locks, of which the following is a specification.

This invention relates to locks, and particularly to locks which may be used upon swinging doors in certain convenient situations, as for example in connection with an outside house door whereon it may be secured upon its interior side to serve as a night lock. Locks used in such or similar situations are susceptible to being picked or dislocated by a burglar reaching thereto with a jimmy through the exterior of the door.

The principal object of my invention is to provide a simple, inexpensive, efficient, and improved lock, adaptable to be utilized in the above mentioned or similar situations, that will prevent, by such means as jimmying through the exterior, any attempt to reach its lock-bolt in order to bend it or shift it aside laterally, vertically, or in any other direction, and that will also prevent any attempted lateral or other form of dislocation of the lock-casing or its keeper, whereby opening or breaking in through the door will be frustrated.

Other objects and advantages will hereinafter appear.

In the accompanying drawings,—Figure 1 is a sectional elevation of the lock showing the disposition of its parts when in locked state. Fig. 2 is a sectional plan view of the lock taken on the line $x$—$x$ of Fig. 1. Fig. 3 is a view similar to Fig. 1 but showing the disposition of the parts of the lock when in unlocked state. Fig. 4 is a sectional elevation of the lock-casing showing the bolt therein when disposed in unlocked state. Fig. 5 is an elevation of the exterior of the lock showing it locked to its keeper. Figs. 6, 7, and 8 are perspective detail views showing the lock-casing, the keeper, and the bolt respectively.

A cast-metal casing 1 containing the locking mechanism and constituting the lock body proper is secured, by means of screws 2, against the inner side of a swinging door 3 which opens into the interior of a room and swings about a vertical axis of its hinges in the direction of the arrow, Fig. 2. A keeper 4 for the lock is secured to the door-frame 5 by screws 6 in openings 7 thereof. The tumbler-barrel 8 of the lock mechanism passes through the door 3 whereby a key 9 may be inserted from the exterior to unlock the door, while at the inner side of the door it may be unlocked by turning a knob 10.

When the lock-casing 1 is secured in properly alined position against the door 3 its end portion 11 which is entirely incased extends beyond the door-edge 12 and overlaps the door-frame 5 and the keeper 4. Within the extending end-portion 11 is contained a pair of cylindrical bolts 13 which are connected by brackets 14 to a post 15. Said cylindrical bolts are disposed vertically and have their axes concentric, and they fit against the outermost side of the wall of the extending casing-portion 11 which is convexedly formed thereat to follow the configuration of the bolts. The connecting post 15 is fitted against lateral displacement between a guiding-ledge 16 cast upon the wall of the casing 1 and the back-plate 17 of said casing. The bolts 13, being thus guided at three sides, may be shifted in a vertical direction upwardly and downwardly, from the position shown in Fig. 1 to that shown in Fig. 3 and back. A leaf spring 18 secured to pins 19 in the casing 1 has its extremity 20 bearing against the rear of post 15 and thereby maintains the bolts 13 with the post against their guiding surfaces and also retains said bolts in whatever position they may be placed in their vertical travel. An arm 21 is secured within the casing 1 to the extremity of the shank 22 of the knob 10, and a similar arm 23 is secured to a bar 24 fixed to the barrel 8. Both of said arms lie within a notch 25 formed in the post 15, whereby upon turning of the knob 10 or key 9 in one direction one of the arms 21, 23 actuates the post 15 to raise the bolts 13 to the elevated position shown in Fig. 3, while upon turning said knob or key in an opposite direction the bolts 13 are lowered to the position shown in Fig. 1.

The keeper 4, preferably made of cast-metal, is provided with an angle portion 26 comprising legs 27, 28 which are fitted against the door-frame 5 and firmly secured thereto by the screws 6. When the keeper 4 is properly fitted in position its leg 27 rests against the inner side of the door-frame 5 and the leg 28 thereof is fitted into a recess 29 formed in the edge 30 of said frame, so that the outer surface of this leg is flush with the frame-edge 30. A pair of ears 31 having central openings 32 and constituting the staple portions of the keeper 4 are formed upon the keeper-leg 27 adjacent the leg 28. Said ears are located at the upper and lower ends of the leg 27 and have their openings 32 concentric with each other, and the diameters of said openings are adaptable to fittingly receive the bolts 13. Upon closing of the door 3 both of the ears 31 enter into the end portion 11 of the lock-casing 1 through notched openings 33 provided in the side $11^a$ of said end-portion adjacent said door, which notched openings may, as here shown, extend around the remaining sides $11^b$, $11^c$ of the end-portion 11. And when securing the keeper 4 in proper position in the installation of the lock, its ears 31 are alined in such manner that when entering the receiving openings 33 in casing 1 the centers of the ear openings 32 will register with the joint axes of the bolts 13, whereby upon said bolts being thereafter shifted downwardly they will enter into the openings 32 as shown in Fig. 1. Turning of the knob 10 or key 9 to dispose the bolts 13 in the elevated position shown in Fig. 3 causes the door 3 to be maintained in unlocked state so that it may be freely opened or closed, and when it is desired to lock the door it is first closed and the knob 10 or key 9 is then turned to lower the bolts 13 into the ear openings 32 in the position shown in Fig. 1.

In their unlocked state the bolts 13 are entirely concealed and incased, Figs. 3, 4, by the extending end-portion 11 of the casing 1, and when said bolts are interlocked with the keeper 4 their middle portions 34 are surrounded by the metal of ears 31 while their upper and lower extremities 35 are surrounded and incased by the metal of the casing-end 11 adjacent to said ears. The bolts 13 are therefore strongly protected by the completely incasing metal of the casing-end 11 and of the ears 31, and should any attempt be made to elevate or otherwise dislocate said bolts, by reaching thereto with a jimmy through the exterior of the door, said incasing metal would prevent access to the bolts and frustrate such attempt. Should it be attempted to bend away or dislocate the keeper-ears 31 or the bolts 13 laterally the same would be prevented on account of the projection of the upper and lower bolt extremities 35 within the casing-end 11 and their incasement thereby. The interlocking of the casing-end 11, the keeper-ears 31, and the bolts 13 will prevent any attempted up and down dislocation of the lock or keeper. The keeper-legs 27, 28 secured to the inner side and edge of the door-frame 5 will also conduce toward the prevention of attempted dislocation of the keeper or reaching to the bolts 13 through the outer side of the door. It will be evident that by means of this lock construction any other means of picking or dislocation of the lock by jimmying will be prevented and burglarizing or breaking in frustrated.

Variations may be resorted to within the scope of the invention.

Having thus described my invention, I claim:—

A lock for a door swinging about a vertical axis having the combination of a casing containing the locking mechanism adaptable to be secured to the side of the door, a keeper adaptable to be secured to the door-frame having ears extending therefrom, a portion of said casing extending beyond the edge of said door and having openings in its side adjacent to the door adapted to receive said ears, and a plurality of bolts extending beyond the edge of the door and inclosed by said extending casing-portion being actuated by the locking mechanism to move vertically through said ears to interlock said casing with said ear.

SAMUEL SEGAL.

Witnesses:
N. C. Donato,
B. Roman.